US010202536B2

(12) United States Patent
Pearl, Jr. et al.

(10) Patent No.: US 10,202,536 B2
(45) Date of Patent: Feb. 12, 2019

(54) OVERCOMING THE RETARDATION OF CEMENT HYDRATION FROM DISPERSING AGENTS USED IN SUSPENSION OF ADDITIVES

(71) Applicant: Halliburton Energy Services, Inc., Houston, TX (US)

(72) Inventors: William Cecil Pearl, Jr., Houston, TX (US); Krishna Ravi, Kingwood, TX (US); Romildo Dias Toledo Filho, Houston, TX (US); Oscar Mendoza Reales, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/552,159

(22) PCT Filed: Mar. 13, 2015

(86) PCT No.: PCT/US2015/020485
§ 371 (c)(1),
(2) Date: Aug. 18, 2017

(87) PCT Pub. No.: WO2016/148678
PCT Pub. Date: Sep. 22, 2016

(65) Prior Publication Data
US 2018/0030330 A1    Feb. 1, 2018

(51) Int. Cl.
*E21B 33/14*    (2006.01)
*C09K 8/467*    (2006.01)
(Continued)

(52) U.S. Cl.
CPC ............ *C09K 8/467* (2013.01); *C04B 14/04* (2013.01); *C04B 14/386* (2013.01); *C04B 28/02* (2013.01);
(Continued)

(58) Field of Classification Search
None
See application file for complete search history.

(56) References Cited

U.S. PATENT DOCUMENTS

| 5,571,281 | A | 11/1996 | Allen |
| 8,586,512 | B2 | 11/2013 | Roddy et al. |

(Continued)

FOREIGN PATENT DOCUMENTS

CA    2681606    11/2008

OTHER PUBLICATIONS

Pang et al, "Nanosilicas as Accelerators in Oilwell Cementing at Low Temperatures", SPE Drilling & Completion, SPE-168037-PA, 2014, vol. 29, pp. 98-105.

(Continued)

*Primary Examiner* — Andrew Sue-Ako
(74) *Attorney, Agent, or Firm* — Craig W. Roddy; Tumey L.L.P.

(57) ABSTRACT

A method of cementing a subterranean formation includes forming a cement composition comprising cementitious material, an aqueous base fluid, a nano-reinforcement particle suspension comprising a surfactant; nano-reinforcement particle such as single-wall carbon nanotubes or multi-wall carbon nanotubes; and pozzolanic material; introducing the cement composition into a subterranean formation; and allowing the cement composition to set in the subterranean formation. A method of making a cement composition includes combining cementitious material, an aqueous base fluid, a nano-reinforcement particle suspension comprising a surfactant, nano-reinforcement articles such as single-wall carbon nanotubes or multi-wall carbon nanotubes, and a pozzolanic material, where the rate of hydration of the (Continued)

surfaces of the cementitious material is less retarded by the surfactant than an equivalent cement composition without pozzolanic material.

20 Claims, 10 Drawing Sheets

(51) Int. Cl.
  *C04B 28/02* (2006.01)
  *C04B 28/04* (2006.01)
  *C04B 40/00* (2006.01)
  *C04B 14/04* (2006.01)
  *C04B 14/38* (2006.01)
  *C04B 103/00* (2006.01)
  *C04B 111/00* (2006.01)
  *C04B 103/40* (2006.01)

(52) U.S. Cl.
  CPC .......... *C04B 28/04* (2013.01); *C04B 40/0039* (2013.01); *E21B 33/14* (2013.01); *C04B 2103/0088* (2013.01); *C04B 2103/402* (2013.01); *C04B 2111/00008* (2013.01); *Y02W 30/92* (2015.05)

(56) References Cited

U.S. PATENT DOCUMENTS

| | | |
|---|---|---|
| 8,598,093 B2 | 12/2013 | Roddy et al. |
| 8,865,107 B2 | 10/2014 | Hersam et al. |
| 2006/0075932 A1* | 4/2006 | Lecolier .................. C04B 28/02 106/677 |
| 2009/0124522 A1 | 5/2009 | Roddy |
| 2009/0229494 A1 | 9/2009 | Shah et al. |
| 2010/0273912 A1 | 10/2010 | Roddy et al. |
| 2011/0067864 A1* | 3/2011 | Reddy .................. C04B 14/386 166/285 |
| 2013/0213638 A1* | 8/2013 | Keller ..................... C04B 28/02 166/248 |
| 2014/0090842 A1* | 4/2014 | Patil .................... C04B 40/0039 166/293 |

OTHER PUBLICATIONS

Pang et al, "A Comparison Study of Portland Cement Hydration Kinetics as Measured by Chemical Shrinkage and Isothermal Calorimetry", Cement and Concrete Composites, 2013, vol. 39, pp. 23-32.

First Australian Examination Report for Application No. 2015387241 dated Dec. 11, 2017.

International Search Report and Written Opinion for PCT/US2015/020485 dated Dec. 9, 2015.

"Properties of Oil Well Cement Reinforced by Carbon Nanotubes" by Rahimirad et al. Dated 2012.

"Influence of Nanomaterials in Oilwell Cement Hydration and Mechanical Properties" by Santra et al. Dated 2012.

"Nanotechnology in concrete—A review" by Sanchez et al. Dated 2010.

"Highly dispersed carbon nanotube reinforced cement based materials" by Konsta-Gdoutos et al. Dated 2010.

* cited by examiner

OVERCOMING THE RETARDATION OF CEMENT HYDRATION FROM DISPERSING AGENTS USED IN SUSPENSION OF ADDITIVES

BACKGROUND

Cementing is a common well operation. For example, hydraulic cement compositions can be used in cementing operations in which a string of pipe, such as casing or liner, is cemented in a wellbore. The cemented string of pipe isolates different zones of the wellbore from each other and from the surface. Hydraulic cement compositions can be use in primary cementing of the casing or in completion operations. Hydraulic cement compositions can also be utilized in intervention operations, such as in plugging highly permeable zones or fractures in zones that may be producing too much water, plugging cracks or holes in pipe strings, and the like.

Cementing and Hydraulic Cement Compositions

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Nano-reinforcements such as carbon nanotubes may be used to increase the Young's modulus and hardness in cement compositions. However, they typically are available dispersed in water with surfactants, which may cause retardation effects in cement.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIGS. 4 A, B are heat flow curves of pure cement paste and cement paste with various amounts of MWCNT and nano-silica (NS).

FIGS. 6 A, B are cumulative heat curves of pure cement paste and cement paste with various amounts of MWCNT and NS.

DETAILED DESCRIPTION

The present invention generally relates to the use of cement compositions in subterranean operations, and, more specifically, to cement compositions with nano-structural particles and nano-reinforcement materials and methods of using these compositions in various subterranean operations.

Surfactants are commonly used as dispersing agents in colloid technology and have been identified as an effective dispersing agent for non-functionalized carbon nanotubes in water. However, some surfactants molecules, such as lignosulfonates or polyacrylates, adsorb onto the anhydrous surfaces of cement grains and retard its hydration reaction. This poses a challenge when dispersing carbon nanotubes in a cement matrix using an excess of surfactant. Because adsorption is a surface area phenomenon, a novel approach to minimize this retardation effect is introducing an additional surface area onto which the excess surfactant molecules can adsorb, preventing them from adsorbing onto the surface of the cement grains and retarding the hydration. Nano-reinforcement materials, such as nano-silica particles, are an option for this because they have a dual functionality, high surface area for surfactant adsorption, and high pozzolanic activity at early ages.

A novel use of pozzolans is to utilize them in cement compositions containing nano-reinforcement dispersed in a surfactant, for downhole applications. In an exemplary embodiment, a method of cementing in a subterranean formation comprises forming a cement composition comprising cementitious material, an aqueous base fluid, a nano-reinforcement particle suspension comprising a surfactant; and a pozzolanic material, wherein the pozzolanic material is selected from the group consisting of micropozzolanic material, nano-pozzolanic material, and combinations thereof; introducing the cement composition into a subterranean formation; and allowing the cement composition to set in the subterranean formation. In another embodiment, the rate of hydration of the surfaces of the cementitious material is less retarded by the surfactant than an equivalent cement composition without pozzolanic material. In yet another embodiment, in the forming step, the nano-reinforcement particle suspension comprising a surfactant and the pozzolanic material are combined before adding the cementitious material and aqueous base fluid. In some embodiments, wherein the nano-reinforcement are at least one selected from single-wall carbon nanotubes (SWCNT), multi-wall carbon nanotubes (MWCNT), and combinations thereof. In other embodiments, the surfactant is an anionic surfactant. In further embodiments, the nano-reinforcement are present in an amount of about 0.01% to about 3.0% by weight of cement. In some embodiments, the pozzolanic material is at least one selected from nano-silica, nano-clay, nano-fly ash, micro-silica, micro-clay, micro-fly ash, and combinations thereof. In certain embodiments, the pozzolanic material is present in an amount of about 0.01% to about 20.0% by weight of cement. In many embodiments, the aqueous base fluid comprises at least one of fresh water; brackish water; saltwater; and combinations thereof and is present in an amount of from about 20% to about 250% by weight of cement. In certain embodiments, the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof. In certain embodiments, the cement compositions further comprise at least one of resins; latex; stabilizers; silica; pozzolans; microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof. In another embodiment, the density of the cement before curing is from about 7 pounds per gallon to about 20 pounds per gallon.

The invention is also directed to making cement compositions. In an exemplary embodiment, a method of making a well cement composition comprises: combining a cementitious material; an aqueous base fluid; a nano-reinforcement particle suspension comprising a surfactant; and a pozzolanic material, wherein the pozzolanic material is selected from the group consisting of micro-pozzolanic material, nano-pozzolanic material, and combinations thereof; wherein the rate of hydration of the surfaces of the cementitious material is less retarded by the anionic surfactant than an equivalent cement composition without pozzolanic material. In an exemplary embodiment, the nano-reinforcement particles are at least one selected from single-wall carbon nanotubes (SWCNT), multi-wall carbon nanotubes (MW-CNT), and combinations thereof. In some embodiments, the surfactant is an anionic surfactant. In further embodiments, the nano-reinforcement particles are present in an amount of about 0.01% to about 3.0% by weight of cement. In some embodiments, the pozzolanic material is at least one selected from nano-silica, nano-clay, nano-fly ash, micro-silica, micro-clay, micro-fly ash, and combinations thereof. In certain embodiments, the pozzolanic material is present in an amount of about 0.01% to about 20.0% by weight of cement. In many embodiments, the aqueous base fluid comprises at least one of fresh water; brackish water; saltwater; and combinations thereof and is present in an amount of from about 20% to about 250% by weight of cement. In certain embodiments, the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof. In certain embodiments, the cement compositions further comprise at least one of resins; latex; stabilizers; silica; pozzolans; microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof. In another embodiment, the density of the cement before curing is from about 7 pounds per gallon to about 20 pounds per gallon.

The invention is also directed to a wellbore cementing system. In an embodiment, a cementing system comprises an apparatus, including a mixer and a pump, configured to: form a cement composition comprising cementitious material, an aqueous base fluid, a nano-reinforcement particle suspension comprising a surfactant; and a pozzolanic material, wherein the pozzolanic material is selected from the group consisting of micro-pozzolanic material, nano-pozzolanic material, and combinations thereof, wherein the rate of hydration of the surfaces of the cementitious material is less retarded by the anionic surfactant than an equivalent cement composition without pozzolanic material; introduce the cement composition into a subterranean formation; and allow the cement composition to set in the subterranean formation.

Figure 1:
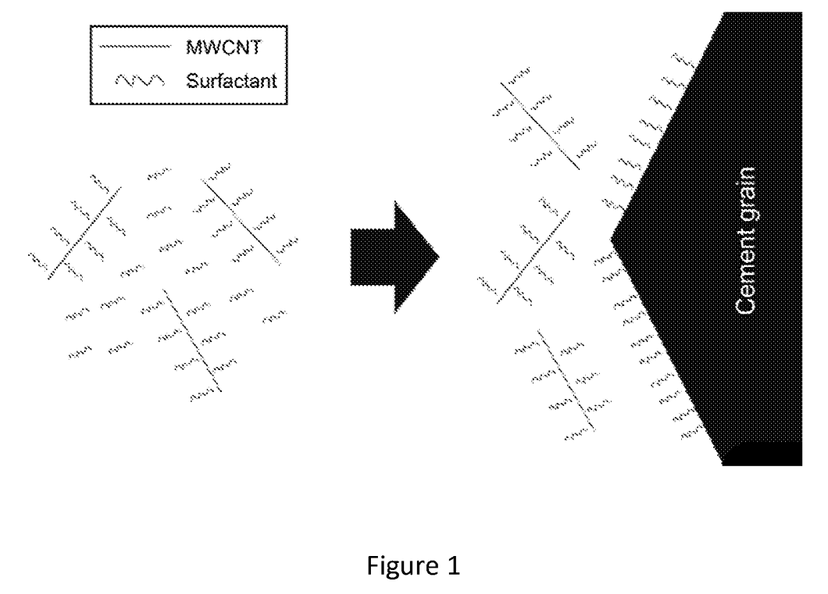
FIG. 1 is a schematic representation of adsorption of surfactant molecules onto multi walled carbon nanotube (MWCNT) and anhydrous cement grains.
Figure 2:
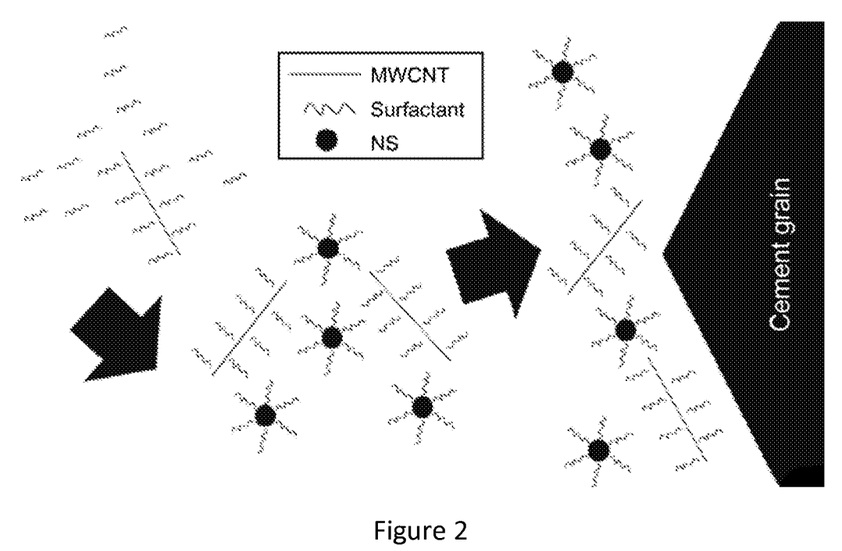
FIG. 2 is a schematic representation of adsorption of surfactant molecules on nano-silica particles instead of cement grains.

The excess of surfactant present in the MWCNT aqueous dispersion, which is used to disperse the nanotubes and maintain the colloid stability over time, may widely retard the hydration reaction of cement. In an embodiment, if nano-silica (NS) particles are mixed with the MWCNT dispersion, the retardation effect becomes minimized, depending on the amount of NS used. However, NS loses some of its pozzolanic activity. Without being held to one theory, FIG. 1 illustrates how the excess of surfactant present in the MWCNT suspension may adsorb onto the surface of cement, keeping the water molecules away from the cement grains and retarding their hydration until desorption occurs and the hydration reaction is resumed. In another embodiment, when NS particles are mixed with the MWCNT dispersion before mixing with cement, as illustrated in FIG. 2, the excess of surfactant molecules may become adsorbed onto their surfaces instead of the surface of the cement grains. The adsorption of surfactant onto the surface of the NS particles may cause a partial loss of its pozzolanic activity.

Nano-Reinforcement Particles

Nano-reinforcement particles useful in the present invention include nano-structures dispersed in an anionic surfactant. Generally, a nano-particle is defined as having a particle size of less than or equal to about 100 nanometers ("nm"). With respect to MWCNT, the inner and outer diameters are less than about 100 nm, regardless of the MWCNT's length.

Nano-reinforcement particles may include at least one of single-wall carbon nanotubes, multi-wall carbon nanotubes, and combinations thereof. Single-walled carbon nanotubes differ from multi-walled carbon nanotubes based on the number of concentric tubes present; single-walled carbon nanotubes comprise only one tube about a given center whereas multi-walled carbon nanotubes have at least two, and often more, nested tubes about a common center. All carbon nanotubes tend to agglomerate into ropes and bundles of many carbon nanotubes, and it is ordinarily quite difficult to obtain individual, dispersed carbon nanotubes. Typical surfactants may include lignosulfonates, polyacrylates, and combinations thereof. In certain embodiments, the carbon nanotubes are present in the amount of about 0.01% to about 3% by weight of cement (bwoc).

A commercially available MWCNT for use in the invention is AQUACYL 0302™ aqueous dispersion, manufactured by Nanocyl s.a., in Belgium. These MWCNTs have an average diameter of 9.5 nm, an average length of 1.5 μm, and are packaged as an aqueous dispersion with a solids concentration of 3% and an anionic surfactant as the dispersing agent.

Aqueous Base Fluids

An aqueous base fluid in the cement compositions of the invention is present in an amount sufficient to make a slurry which is pumpable for introduction down hole. In some embodiments, the aqueous base fluid comprises at least one of fresh water; brackish water; saltwater; and combinations thereof. The water may be fresh water, brackish water, saltwater, or any combination thereof. In certain embodiments, the water may be present in the cement composition in an amount of from about 20% to about 250% by weight of cement ("bwoc"), from about 28% to about 60% bwoc, or from about 36% to about 66% bwoc.

Pozzolanic Material

Pozzolanic materials are present in the cement compositions of the invention and may include nano-silica, nano-clay, nano-fly ash, micro-silica, micro-clay, micro-fly ash, and combinations thereof. Natural pozzolans are siliceous or siliceous and aluminous material, generally present on the Earth's surface and set and harden in the presence of hydrated lime and water. The term "pozzolan" does not necessarily indicate the exact chemical make-up of the material, but rather refers to its capability of reacting with a source of calcium and water to form compounds possessing cementitious properties. When a pozzolan is mixed with water, the silicate phases of the pozzolan can undergo a hydration reaction and form hydration products of calcium silicate hydrate (often abbreviated as C—S—H) and also possibly calcium aluminate hydrate. The degree to which a material functions as a pozzolan can be determined by the material's pozzolanic activity. The pozzolanic activity of a pozzolan is the reaction rate between the pozzolan and a source of calcium (e.g., $Ca^{2+}$, calcium oxides "CaO", or calcium hydroxides "$Ca(OH)_2$") in the presence of water. The pozzolanic activity can be measured by determining the amount of calcium the pozzolan consumes over time or by determining the compressive strength of a pozzolan composition containing the pozzolan and water or a cement composition containing cement, the pozzolan, a source of calcium, and water. In some embodiments, the micro-pozzolans generally have a particle size of about 0.1 to about 100 micrometers.

In certain embodiments, the pozzolanic material may comprise colloidal silica having a particle size in the range of from about 5 nm to about 20 nm. However, it should be noted that the particular nano-particle or micro-particle chosen may be used in combination with differently sized particles of the same material, in accordance with present embodiments. For example, where nano-silica is used, silica with particle sizes greater than 100 nm may be included in a cement composition in accordance with present embodiments.

Generally, nano-clay may be defined as nano-clay having a largest dimension (e.g., length, width, thickness, etc.) of less than about 1 micron. For example, the largest dimension of the nano-clay may be in the range of from about 1 nanometers ("nm") to about 1 micron (e.g., about 10 nm, about 50 nm, about 100 nm, about 200 nm, about 300 nm, about 400 nm, about 500 nm, about 600 nm, about 700 nm, about 800, about 900 nm, etc.) In certain embodiments, the largest dimension of the nano-clay may be in the range of from about 1 nm to about 100 nm. However, it should be noted that the nano-clay may be utilized in combination with differently sized clay particles in accordance with present embodiments. For example, a number of clay particles with particle sizes greater than 1 micron may be included in a cement composition in accordance with present embodiments.

The nano-clay may be configured in any of a variety of different shapes in accordance with embodiments of the present invention. Examples of suitable shapes include nano-clay in the general shape of platelets, shavings, flakes, rods, strips, spheroids, toroids, pellets, tablets, or any other suitable shape. In certain embodiments, the nano-clay may generally have a plate-type structure. Suitable plate-type nano-clays include nano-montmorillonite. Plate-type nano-clay may have a thickness, in certain embodiments of less than about 10 nm and, alternatively, of less than about 2 nm. In certain embodiments, the plate-type nano-clay may have a thickness of about 1 nm.

Nano-fly ash refers to the residue from the combustion of powdered or ground coal, wherein the fly ash carried by the flue gases may be recovered, for example, by electrostatic precipitation. In one embodiment, a nano-pozzolan useful in the invention includes CEMBINDER™ W50 NS, produced by AkzoNobel, Chemicals GmbH, in Germany. This nano-silica has a surface area of 500 $m^2/g$, an average size of 5 nm, and is shipped in an aqueous dispersion with a 15% concentration of silica by weight. In certain embodiments, the nano-silica is present in the amount of about 0.01% to about 20% by weight of cement.

Cementitious Material

A variety of cements can be used in the present invention, including cements comprised of calcium, aluminum, silicon, oxygen, and/or sulfur which set and harden by reaction with water. Such hydraulic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In some embodiments, the suitable API Portland cements are from Classes A, C, H, and G.

Slurry Density

In certain embodiments, the cement compositions have a slurry density which is pumpable for introduction down hole. In exemplary embodiments, the density of the cement composition in slurry form is from about 7 pounds per gallon (ppg) to about 20 ppg, from about 10 ppg to about 18 ppg, or from about 13 ppg to about 17 ppg.

Cement Additives

The cement compositions of the invention may contain additives. In certain embodiments, the additives comprise at least one of resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, formation conditioning agents, and combinations thereof.

The exemplary cement compositions disclosed herein may directly or indirectly affect one or more components or pieces of equipment associated with the preparation, delivery, recapture, recycling, reuse, and/or disposal of the disclosed cement compositions. For example, and with reference to FIG. 3, the disclosed cement compositions may directly or indirectly affect one or more components or pieces of equipment associated with an exemplary wellbore drilling assembly 100, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

Figure 3:
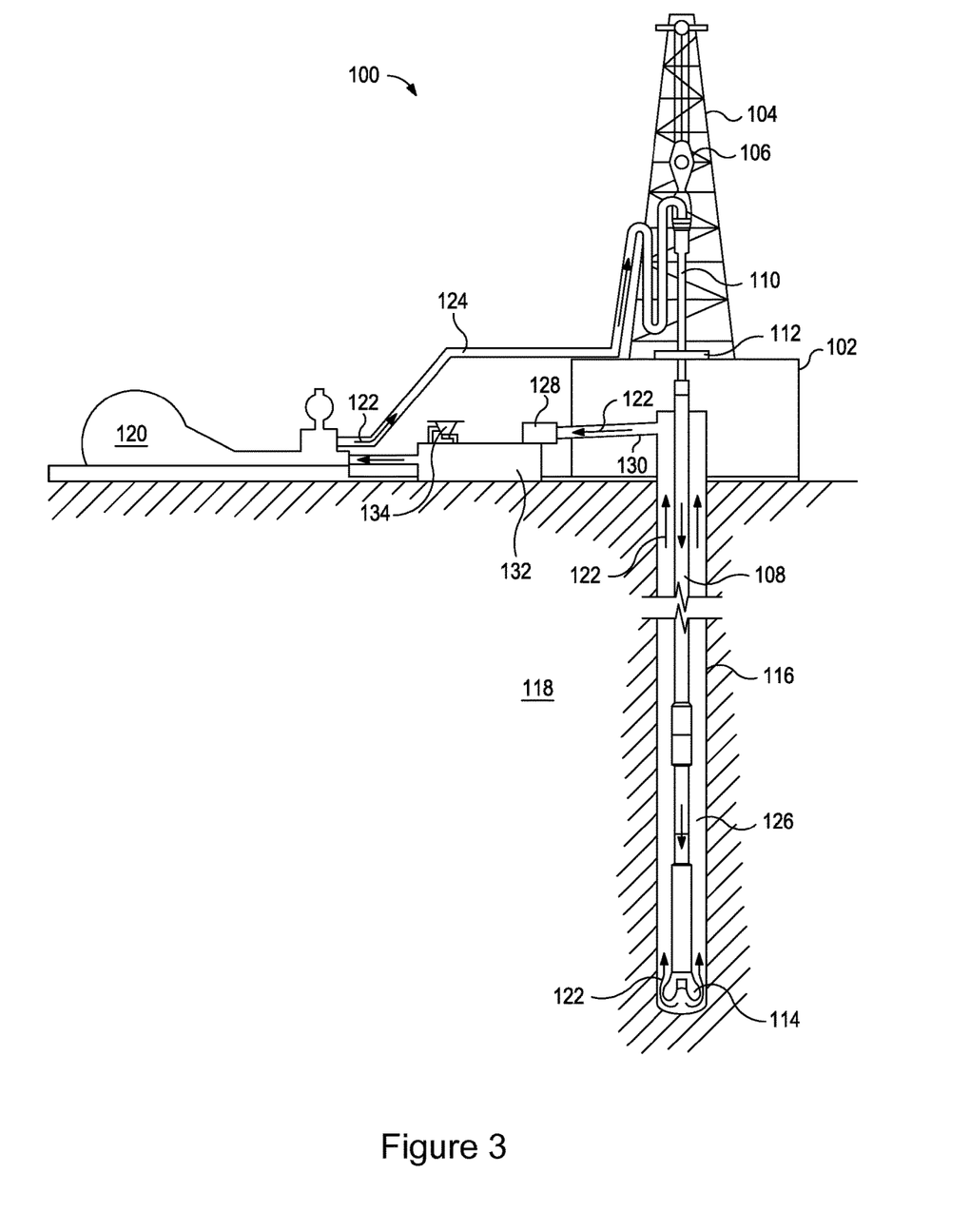
FIG. 3 shows an illustrative example of an apparatus useful for cementing a wellbore with the cement compositions of the invention.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed cement compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed cement compositions may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed cement compositions may be stored, reconditioned, and/or regulated until added to the drilling fluid 122.

As mentioned above, the disclosed cement compositions may directly or indirectly affect the components and equipment of the drilling assembly 100. For example, the disclosed cement compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary cement compositions.

The disclosed cement compositions may directly or indirectly affect the pump 120, which representatively includes any conduits, pipelines, trucks, tubulars, and/or pipes used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The disclosed cement compositions may also directly or indirectly affect the mixing hopper 134 and the retention pit 132 and their assorted variations.

The disclosed cement compositions may also directly or indirectly affect the various downhole equipment and tools that may come into contact with the cement compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed cement compositions may also directly or indirectly affect any downhole heat exchangers, valves and corresponding actuation devices, tool seals, packers and other wellbore isolation devices or components, and the like associated with the wellbore 116. The disclosed cement compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed cement compositions may also directly or indirectly affect any transport or delivery equipment used to convey the cement compositions to the drilling assembly 100 such as, for example, any transport vessels, conduits, pipelines, trucks, tubulars, and/or pipes used to fluidically move the cement compositions from one location to another, any pumps, compressors, or motors used to drive the cement compositions into motion, any valves or related joints used to regulate the pressure or flow rate of the cement compositions, and any sensors (i.e., pressure and temperature), gauges, and/or combinations thereof, and the like.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Material Information

The materials used in the experiments were Class G cement produced by Holcim Ltd, in Switzerland, AQUA-CYL 0302™ MWCNT aqueous dispersion, and Cembinder W50™ colloidal silica (NS). The MWCNT had an average diameter of 9.5 nm and an average length of 1.5 µm according to the manufacturer; the nanotubes came as an aqueous dispersion with a solids concentration of 3% and an anionic surfactant as the dispersing agent.

Procedures

A reference sample of pure cement was prepared using a water-to-cement ratio of 0.45, which was hand mixed for 90 seconds until a homogenous paste was obtained. Cement/MWCNT pastes were prepared by combining the MWCNT dispersion with the mixing water, maintaining the same water-to-cement ratio (w/c: 0.45) and a constant 0.25% addition of MWCNT by weight of cement, and then adding cement and hand mixing.

Cement/MWCNT/NS were prepared first by adding the MWCNT and NS dispersions to the mixing water and then applying 500 J of ultrasonic energy with an ultrasonic tip processor to ensure homogeneity; the water content from the MWCNT and NS dispersions was taken into account to maintain constant water content of 18.63 g in each sonication procedure. The 0.25% addition of MWCNT was maintained and the amount of NS substitution was varied between 0.05 and 1.0%. After mixing the two dispersions, the cement was added and hand mixed.

A portion of 5 g of each paste was sealed in a glass ampoule and used immediately for isothermal calorimetry at 23° C. The rest of the paste was cured in 50 mL plastic airtight containers at room temperature for 80 hours. When testing age was reached, the hydration was stopped using a freeze dryer. Thermogravimetric analysis (TGA) was performed using a platinum crucible in an $N_2$ inert atmosphere with a gas flow of 100 mL/min, measured up to 900° C. with a heating rate of 10° C./min. Isothermal calorimetry results were obtained using a TAM Air isothermal calorimeter, with water as reference material.

Isothermal Calorimetry Results

Figure 4A:
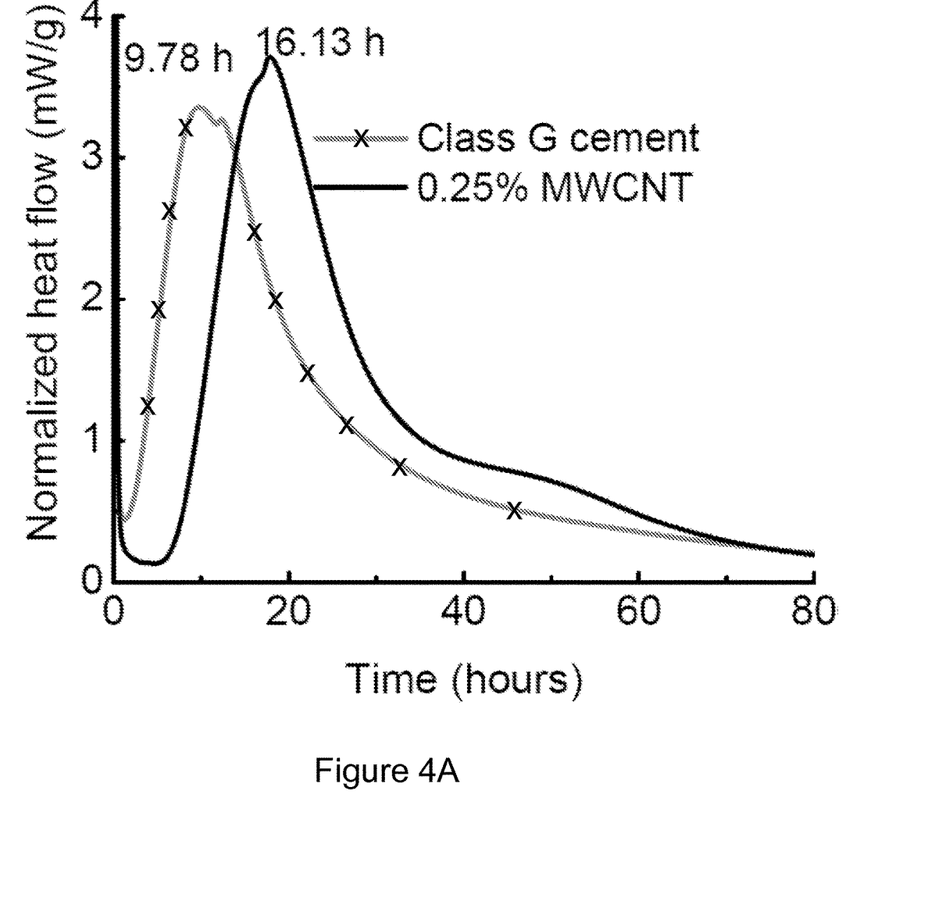
Figure 4B:
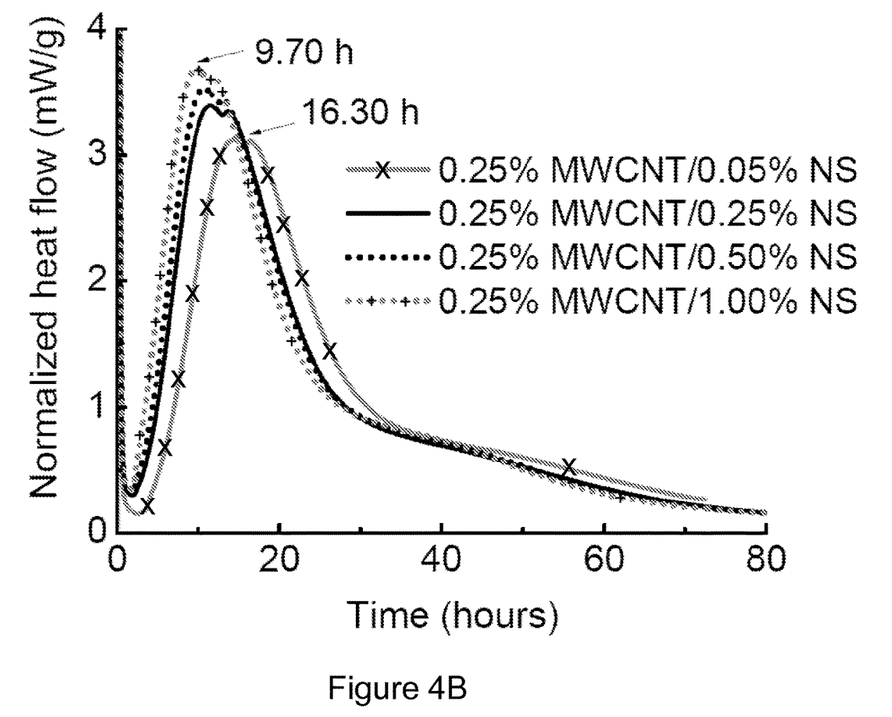
Figure 5:
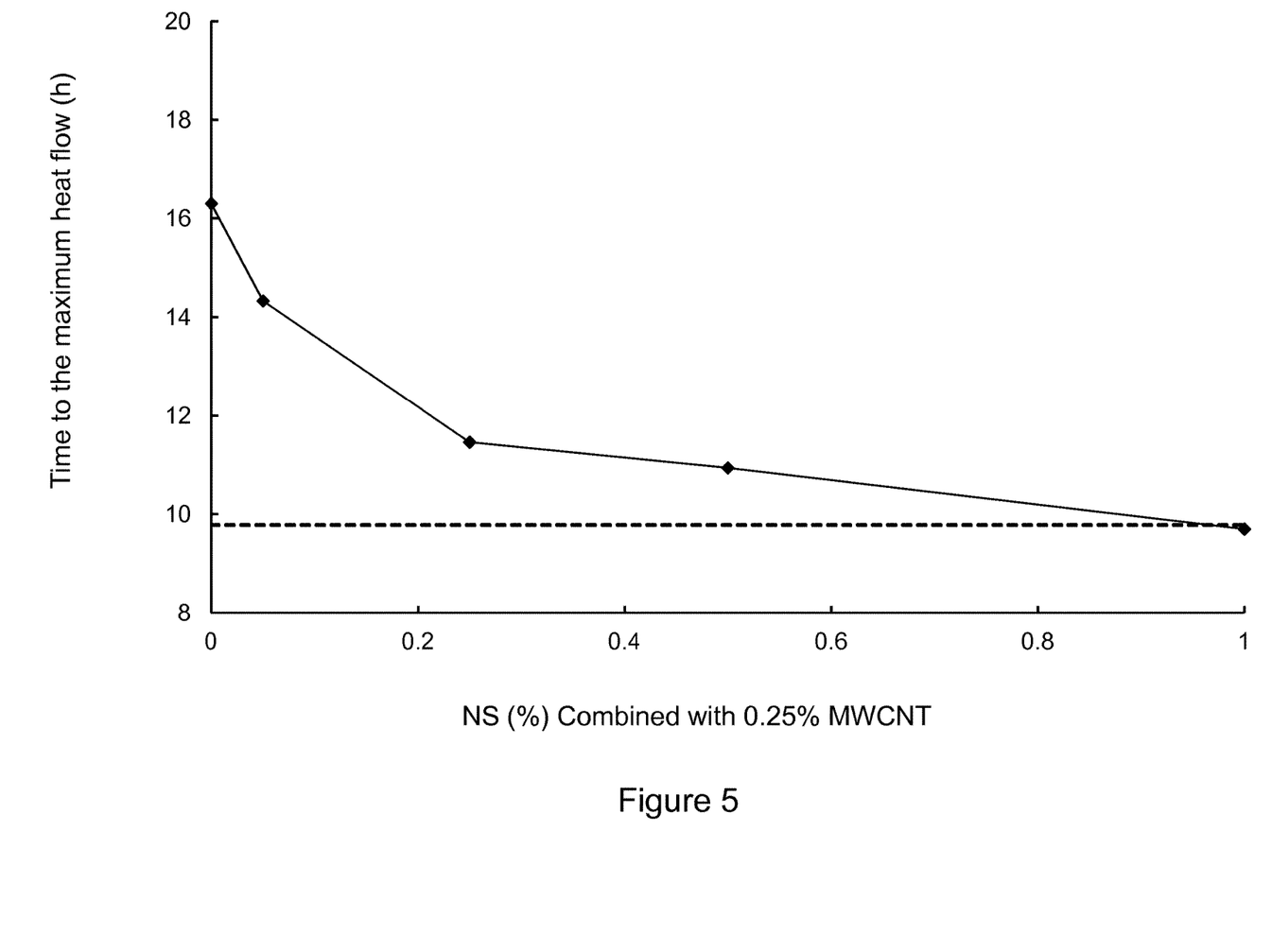
FIG. 5 shows the time to maximum heat flow at various NS concentrations combined MWCNT.

An addition of 0.25% of AQUACYL 0302™ MWCNT aqueous dispersion widely retards the hydration reaction of Class G cement as a result of adsorption onto the surface of the cement grains of the excess surfactant present in the MWCNT. This effect is presented in FIG. 4A, where it can be observed that, if taking as a reference the time at which the maximum heat release occurs, the addition of 0.25% MWCNT retards the hydration reaction approximately 6 hours. This peak of heat release has been associated to the formation of calcium silicate hydrates (C—S—H) and $Ca(OH)_2$. See Taylor, H. F. W., 1997. *Cement Chemistry*. London: Thomas Telford Services Ltd. (Taylor 1997). In FIG. 4B, it can be observed that when adding NS to the MWCNT dispersion and before mixing with cement, the retardation effect becomes minimized. This is so effective that when using 1.0% NS, the hydration reaction becomes accelerated when compared to the control sample. To obtain a better visualization of the phenomena, the time to the maximum heat flow of the curves in FIGS. 4A and 4B was plotted versus the amount of NS substitution; the result is presented in FIG. 5. FIG. 5 graphs the time of maximum heat flow of cement pastes combined with 0.25% MWCNT and different substitutions of NS, where the dotted line represents the time to maximum heat flow of pure cement paste. One of skill in the art may observe that the time to the maximum heat flow is inversely proportional to the amount of NS introduced into the system and that these are not linearly correlated. Smaller amounts of NS more effectively minimize the effect of the surfactant; this may occur because of the agglomeration phenomena of NS when higher concentrations of nanoparticles are used.

Figure 6A:
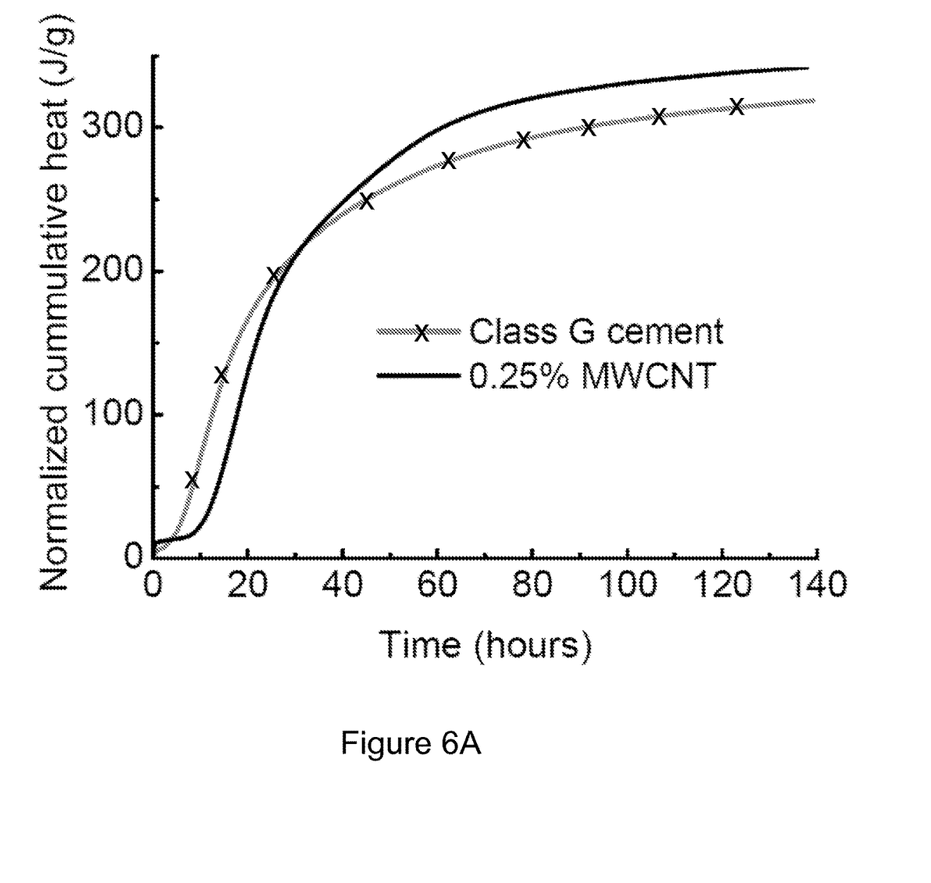
Figure 6B:
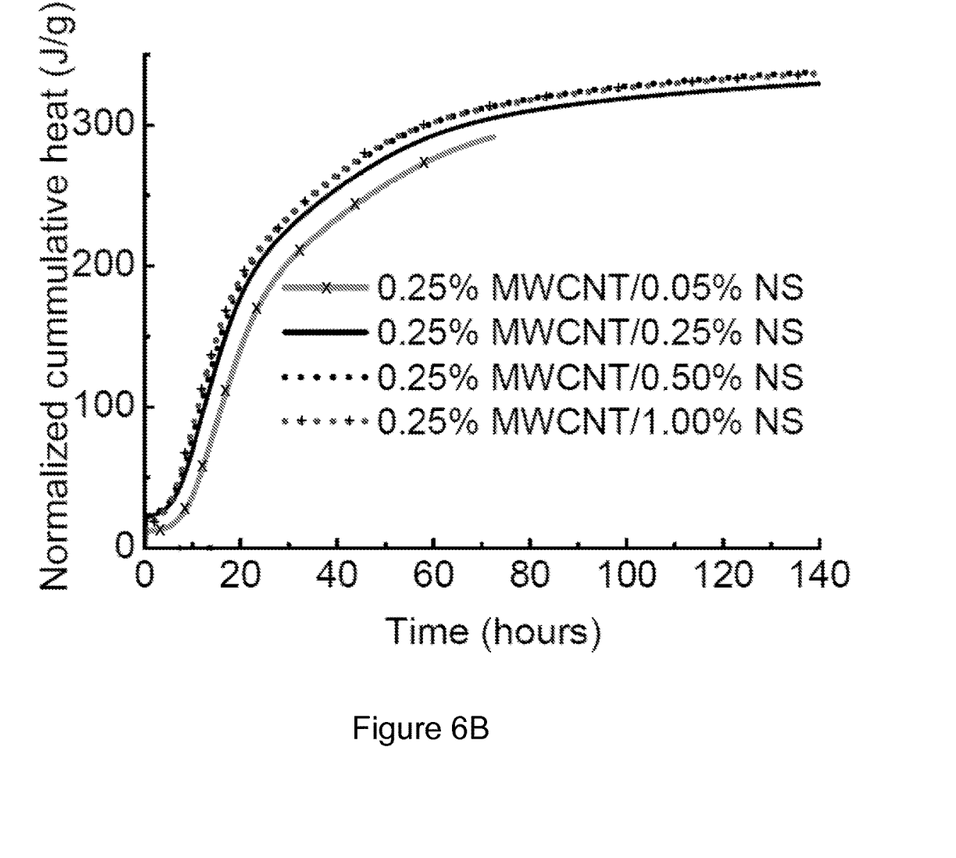

The cumulative heat curves of the studied samples are presented in FIGS. 6A,B. FIG. 6A shows how after the desorption of surfactant from the anhydrous cement grains, the total heat release of the sample blended with 0.25% MWCNT becomes higher than the control sample, possibly indicating that the MWCNT acts as nucleation spots. FIG. 6B shows that for a fixed amount of 0.25% MWCNT, the cumulative heat increases proportionally to the amount of NS. This indicates that despite having adsorbed the excess of surfactant, the NS particles still have pozzolanic activity and are probably also working as nucleation spots.

TGA Results

Figure 7:
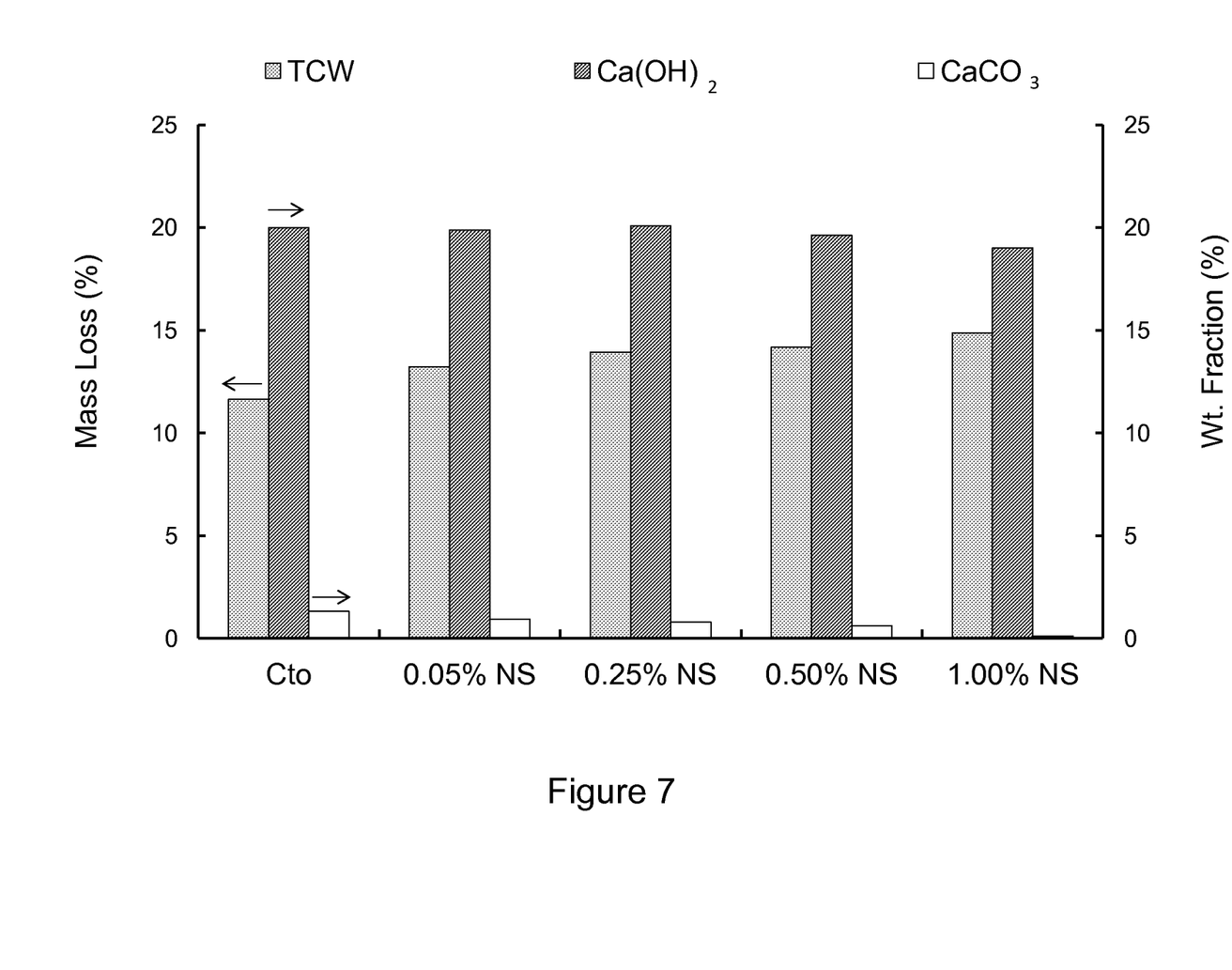
FIG. 7 shows the thermogravimetric analysis of cement paste and various NS concentrations.
Figure 8:
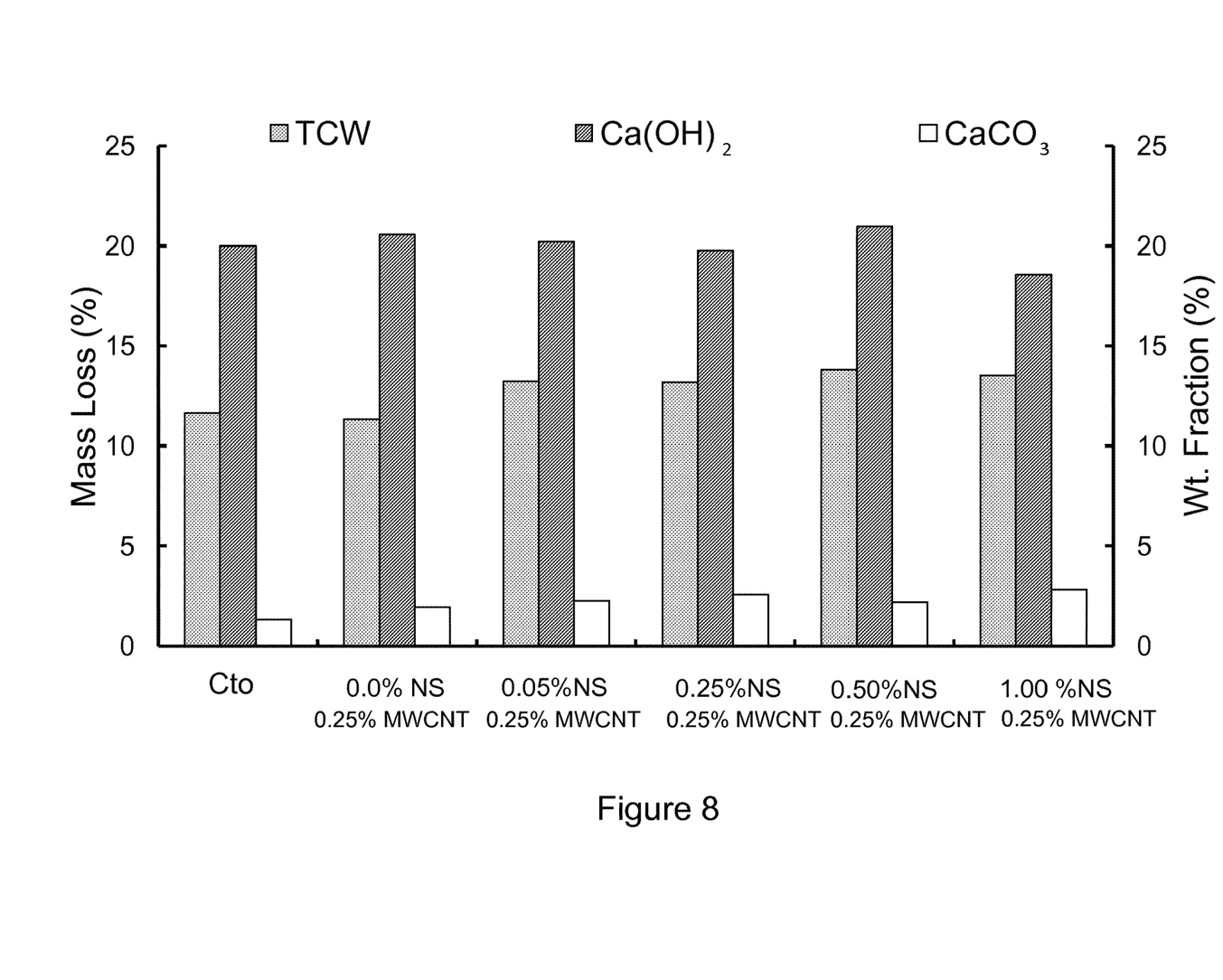
FIG. 8 shows the thermogravimetric analysis of cement paste and MWCNT at various NS concentrations.
Figure 9:
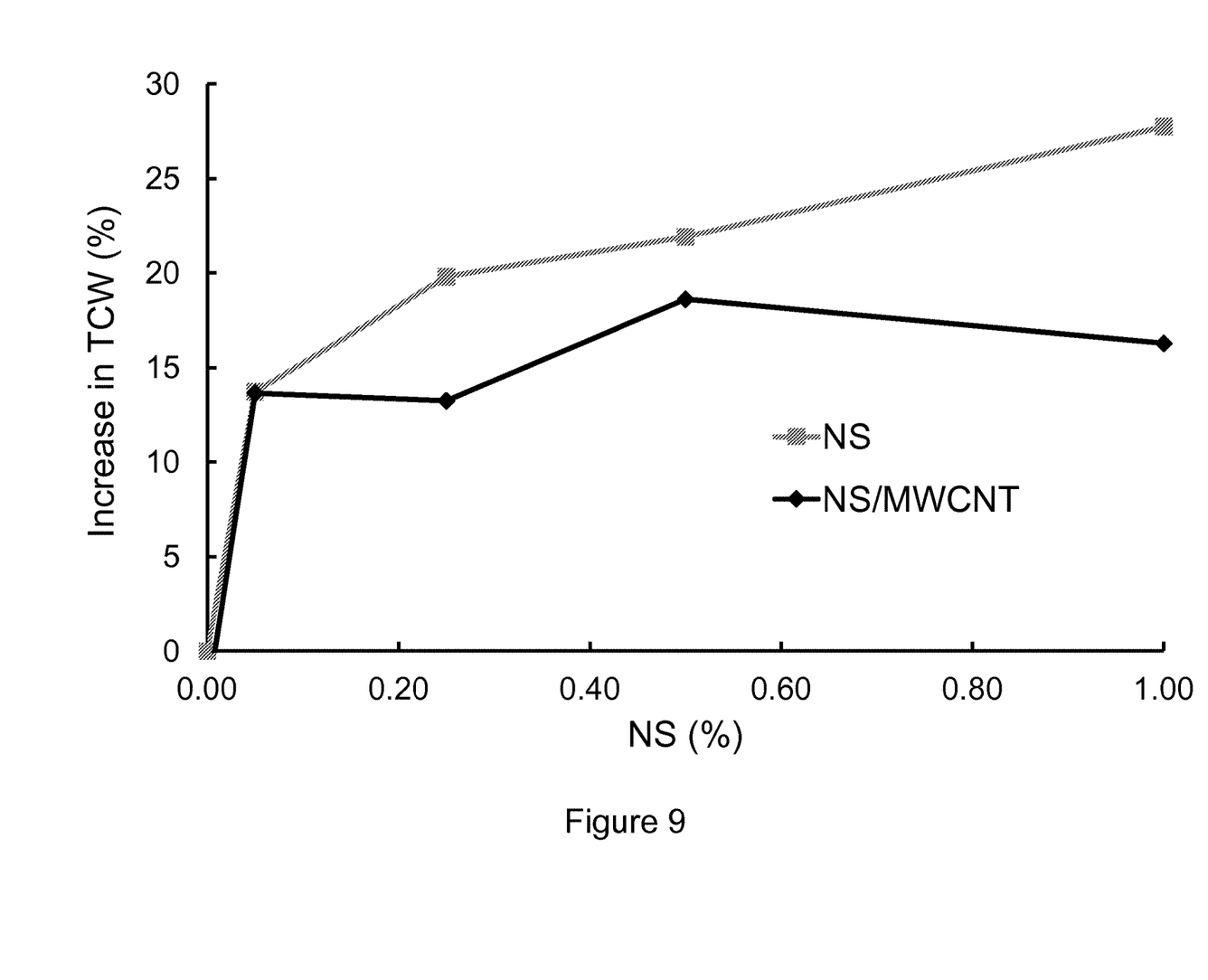
FIG. 9 shows the variation of total combined water (TCW) after curing with respect to pure cement paste and cement paste with MWCNT and NS.

TGA were performed to confirm if the NS particles still had pozzolanic activity after adsorbing the excess of surfactant present in the MWCNT dispersion. For this purpose, TG and derivative thermogravimetric (DTG) curves were obtained from samples blended with MWCNT and NS and compared with results from samples blended only with NS. Three main decomposition events were identified: (i) the dehydration of C—S—H, ettringite (Aft), monosulfoaluminate (AFm), and aluminate calcium hydrates (ACH and CASH) up to 200° C.; (ii) the dehydration of $Ca(OH)_2$ around 450° C., and (iii) the decarbonation of $CaCO_3$ around 600° C. The $CaCO_3$ weight fractions were corrected by the initial carbonate content of the cement before hydration, and the $Ca(OH)_2$ weight fractions were corrected by the $CaCO_3$ from carbonation. Because of the non-stoichiometric nature of C—S—H and the impossibility of separating the individual mass loss associated with the dehydration of C—S—H, AFt, AFm, ACH, and CASH, the weight fraction of these components was not calculated but combined with the mass loss from $Ca(OH)_2$; this was called the total combined water (TCW). FIG. 7 shows the TGA quantification results of pastes combined with different concentrations of NS that are cured for 80 hours. FIG. 8 shows the TGA quantification results of pastes combined with 0.25% MWCNT and different concentrations of NS that are cured for 80 hours. Variations of TCW in each sample after 80 hours of curing were calculated as a percentage of the TCW of a plain cement paste cured under the same conditions. The results are presented in FIG. 9.

The results show that all the amounts of NS studied generated an increase of TCW as consequence of a higher formation of C—S—H, due to its pozzolanic activity and nucleation effect, see Singh, L. P., S. R. Karade, S. K. Bhattacharyya, M. M. Yousuf, and S. Ahalawat., 2013. Beneficial Role of Nanosilica in Cement Based Materials—A Review. Construction and Building Materials, 47, 1 069-1 077. The extra C—S—H comes from two sources: from the pozzolanic reaction of NS that uses $Ca(OH)_2$ and water to form C—S—H, and from the acceleration of the $C_3S$ hydration by the nucleation effect. The acceleration of the $C_3S$ hydration generates not only extra C—S—H, but also additional $Ca(OH)_2$; this additional $Ca(OH)_2$ might be partially or totally consumed by the pozzolanic reaction, depending on the reactivity of the pozzolan. This was confirmed in FIG. 8, where it can be seen that the amount of $Ca(OH)_2$ in the sample remains fairly constant, while the TCW increases up to 30% with respect to plain cement for 1.0% NS; this change is driven by an increase of C—S—H production. When using the combinations of NS with MWCNT, an increase of TCW was also identified in the pastes, but in a smaller magnitude. This indicates that after adsorbing the excess of surfactant, the NS particles still have pozzolanic activity, but this activity is limited by the presence of the surfactant molecules on its surface. For 0.25% MWCNT/1.0% NS, the increase of TCW was 16%, almost half of that obtained without the presence of MWCNT and surfactant in the media.

Experimental Overall Results

One of skill in the art may likely deduce at least the following from the experiments above: (a) The excess surfactant used to disperse the MWCNT adsorbs onto the cement grains and retards its hydration reaction, which is only resumed when the surfactant desorbs from their surface; (b) NS particles mixed with the MWCNT dispersion adsorb the excess of surfactant instead of the cement grains, thus possibly minimizing the retarding effect of the surfactant; and (c) The adsorption of surfactant onto the surface of NS particles may cause a partial loss of its pozzolanic activity.

Embodiments disclosed herein include:

A: A method of cementing in a subterranean formation comprising: forming a cement composition comprising cementitious material, an aqueous base fluid, a nano-reinforcement particle suspension comprising a surfactant; and a pozzolanic material, wherein the pozzolanic material is selected from the group consisting of micro-pozzolanic material, nano-pozzolanic material, and combinations thereof; introducing the cement composition into a subterranean formation; and allowing the cement composition to set in the subterranean formation.

B: A method of making a well cement composition comprising: combining a cementitious material; an aqueous base fluid; a nano-reinforcement particle suspension comprising a surfactant; a pozzolanic material, wherein the pozzolanic material is selected from the group consisting of pozzolanic material, nano-pozzolanic material, and combinations thereof; and wherein the rate of hydration of the surfaces of the cementitious material is less retarded by the surfactant than an equivalent cement composition without pozzolanic material.

C: A wellbore cementing system comprising: an apparatus, including a mixer and a pump, configured to: form a cement composition comprising cementitious material, an aqueous base fluid, a nano-reinforcement particle suspension comprising a surfactant; and a pozzolanic material, wherein the pozzolanic material is selected from the group consisting of micro-pozzolanic material, nano-pozzolanic material, and combinations thereof; wherein the rate of hydration of the surfaces of the cementitious material is less retarded by the surfactant than an equivalent cement composition without pozzolanic material; introduce the cement composition into a subterranean formation; and allow the cement composition to set in the subterranean formation.

Each of embodiments A, B, and C may have one or more of the following additional elements in any combination: Element 1: wherein the rate of hydration of the surfaces of the cementitious material is less retarded by the surfactant than an equivalent cement composition without pozzolanic material. Element 2: wherein in the forming, the a nano-reinforcement particle suspension comprising a surfactant and pozzolanic material are combined before adding the cementitious material and aqueous base fluid. Element 3: wherein the surfactant is an anionic surfactant. Element 4: wherein the nano-reinforcement are present in an amount of about 0.01% to about 3.0% by weight of cement. Element 5: wherein the nano-reinforcement particles are at least one selected from single wall carbon nano tubes (SWCNT), multi-wall carbon nanotubes (MWCNT), and combinations thereof. Element 6: wherein the pozzolanic material is present in an amount of about 0.01% to about 20.0% by weight of cement. Element 7: wherein the pozzolanic material is at least one selected from nano-silica, nano-clay, nano-fly ash, micro-silica, micro-clay, micro-fly ash, and combinations thereof. Element 8: wherein the aqueous base fluid comprises at least one of fresh water; brackish water; saltwater; and combinations thereof. Element 9: wherein the aqueous base fluid is present in the cement composition in an amount of from about 20% to about 250% by weight of cement. Element 10: wherein the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof. Element 11: further comprising at least one of resins; latex; stabilizers; silica; pozzolans, microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof. Element 12: wherein the density of the cement before curing is from about 7 pounds per gallon to about 20 pounds per gallon. Element 13: wherein the pozzolanic material is a micro-pozzolanic material. Element 14: wherein the pozzolanic material is a nano-pozzolanic material. Element 15: wherein the pozzolanic material is nano-silica.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of cementing in a subterranean formation comprising:
    forming a cement composition comprising:
        a cementitious material; and
        an aqueous base fluid;
    combining the cement composition with a nano-reinforcement particle suspension to form a cement slurry, the nano-reinforcement particle suspension comprising:
        a surfactant;
        nano-reinforcement particles wherein the nano-reinforcement particles are selected from the group consisting of single-wall carbon nano tubes, multi-wall carbon nanotubes, and combinations thereof; and
        a pozzolanic material wherein the pozzolanic material is selected from the group consisting of micro-pozzolanic material, nano-pozzolanic material, and combinations thereof;
    introducing the cement slurry into a subterranean formation; and
    allowing the cement slurry to set in the subterranean formation, wherein a rate of hydration of surfaces of the cementitious material in the cement slurry is less retarded by the surfactant than an equivalent cement slurry without pozzolanic material.

2. The method of claim 1, wherein the surfactant is an anionic surfactant.

3. The method of claim 1, wherein the nano-reinforcement particles are present in an amount of about 0.01% to about 3.0% by weight of the cementitious material.

4. The method of claim 1, wherein the pozzolanic material is at least one selected from nano-silica, nano-clay, nano-fly ash, micro-silica, micro-clay, micro-fly ash, and combinations thereof wherein the pozzolanic material is present in an amount of about 0.01% to about 20.0% by weight of cement.

5. The method of claim 1, wherein the aqueous base fluid comprises at least one of fresh water; brackish water; saltwater; and combinations thereof wherein the aqueous base fluid is present in the cement composition in an amount of from about 20% to about 250% by weight of cement.

6. The method of claim 1, wherein the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof.

7. The method of claim 1, wherein the cement composition further comprises at least one of resins; latex; stabilizers; silica; pozzolans, microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof.

8. The method of claim 1, wherein the density of the cement slurry before curing is from about 7 pounds per gallon to about 20 pounds per gallon.

9. A wellbore cementing system comprising:
a cementitious material;
an aqueous base fluid;
a surfactant;
nano-reinforcement articles selected from the group consisting of single-wall carbon nanotubes, multi-wall carbon nanotubes and combinations thereof;
a pozzolanic material selected from the group consisting of micro-pozzolanic material, nano-pozzlanic material, and combinations thereof; and
an apparatus, including a mixer and a pump, configured to:
form a cement composition comprising:
the cementitious material; and
the aqueous base fluid;
form a cement slurry by combining the cement composition and a nano-reinforcement particle suspension, the nano-reinforcement particle suspension comprising the surfactant, the nano-reinforcement particles selected from the group consisting of single-wall carbon nanotubes, multi-wall carbon nanotubes, and combinations thereof, and the pozzolanic material selected from the group consisting of micro-pozzolanic material, nano-pozzolanic material, and combinations thereof, wherein a rate of hydration of surfaces of the cementitious material in the cement slurry is less retarded by the surfactant than an equivalent cement slurry without pozzlanic material;
introduce the cement composition into a subterranean formation; and
allow the cement composition to set in the subterranean formation.

10. The system of claim 9, wherein the surfactant is an anionic surfactant.

11. The system of claim 9, wherein the nano-reinforcement particle suspension comprising the surfactant, the nano-reinforcement particles and the pozzolanic material are combined before adding the cementitious material and aqueous base fluid.

12. The system of claim 9, wherein the nano-reinforcement particles are present in an amount of about 0.01% to about 3.0% by weight of cement.

13. The system of claim 9, wherein the pozzolanic material is selected from the group consisting of nano-silica, nano-clay, nano-fly ash, micro-silica, micro-clay, micro-fly ash, and combinations thereof and wherein the pozzolanic material is present in an amount of about 0.01% to about 20.0% by weight of the cementitious material.

14. The system of claim 9, wherein the aqueous base fluid is selected from the group consisting of fresh water, brackish water, saltwater, and combinations thereof.

15. The system of claim 9, wherein the aqueous base fluid is present in the cement composition in an amount of from about 20% to about 250% by weight of cement.

16. The system of claim 9, wherein the cementitious material comprises a cementitious material selected from the group consisting of Portland cements, gypsum cements, high alumina content cements, slag cements, high magnesia content cements, shale cements, acid/base cements, fly ash cements, zeolite cement systems, kiln dust cement systems, microfine cements, metakaolin, pumice, and combinations thereof.

17. A method of cementing in a subterranean formation comprising:
combining materials to form a cement composition, the materials comprising:
a cementitious material;
an aqueous base fluid; and
a nano-reinforcement particle suspension comprising;
a surfactant;
nano-reinforcement particles wherein the nano-reinforcement particles are selected from the group consisting of single-wall carbon nano tubes, multi-wall carbon nanotubes, and combinations thereof; and
a pozzolanic material wherein the pozzolanic material is selected from the group consisting of micro-pozzolanic material, nano-pozzolanic material, and combinations thereof, wherein the surfactant, nano-reinforcement particles, and pozzolanic material are combined together before combining with the cementitious material and aqueous base fluid;
introducing the cement composition into a subterranean formation; and
allowing the cement composition to set in the subterranean formation, wherein a rate of hydration of surfaces of the cementitious material in the cement composition is less retarded by the surfactant than an equivalent cement composition without pozzolanic material.

18. The method of claim 17, wherein the cementitious material comprises a cementitious material selected from the group consisting of Portland cements, gypsum cements, high alumina content cements, slag cements, high magnesia content cements, shale cements, acid/base cements, fly ash cements, zeolite cement systems, kiln dust cement systems, microfine cements, metakaolin, pumice, and combinations thereof.

19. The method of claim 17, wherein the pozzolanic material is selected from the group consisting of nano-silica, nano-clay, nano-fly ash, micro-silica, micro-clay, micro-fly ash, and combinations thereof and wherein the pozzolanic material is present in an amount of about 0.01% to about 20.0% by weight of the cementitious material.

20. The method of claim 17, wherein the pozzolanic material is present in an amount of about 0.01% to about 20.0% by weight of the cementitious material.

* * * * *